United States Patent
He

(10) Patent No.: US 11,210,690 B2
(45) Date of Patent: Dec. 28, 2021

(54) DEEP REINFORCEMENT LEARNING METHODS AND APPARATUSES FOR REFERRAL MARKETING

(71) Applicant: Advanced New Technologies Co., Ltd., Grand Cayman (KY)

(72) Inventor: Jianshan He, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/085,443

(22) Filed: Oct. 30, 2020

(65) Prior Publication Data
US 2021/0049632 A1 Feb. 18, 2021

Related U.S. Application Data

(63) Continuation of application No. PCT/CN2019/091649, filed on Jun. 18, 2019.

(30) Foreign Application Priority Data

Aug. 3, 2018 (CN) .......................... 201810879896.3

(51) Int. Cl.
*G06Q 30/00* (2012.01)
*G06Q 30/02* (2012.01)
(Continued)

(52) U.S. Cl.
CPC ........... *G06Q 30/0211* (2013.01); *G06N 3/08* (2013.01); *G06Q 30/0201* (2013.01);
(Continued)

(58) Field of Classification Search
CPC ........... G06Q 30/0211; G06Q 30/0201; G06Q 30/0224; G06Q 30/0255; G06Q 40/08; G06N 3/08
See application file for complete search history.

(56) References Cited

U.S. PATENT DOCUMENTS

2005/0071223 A1    3/2005  Jain et al.
2007/0043616 A1*   2/2007  Kutaragi ............. H04N 21/812
                                                    705/14.68
(Continued)

FOREIGN PATENT DOCUMENTS

CN     102033883     4/2011
CN     106529996     3/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Scott C Anderson
(74) *Attorney, Agent, or Firm* — Fish & Richardson P.C.

(57) ABSTRACT

Embodiments of the present specification provide deep reinforcement learning methods and apparatuses for referral marketing. One method includes the following: obtaining state information of an execution environment of a deep reinforcement learning system, wherein the state information comprises user information of a current user of the deep reinforcement learning system; determining a marketing activity corresponding to the state information based on a marketing strategy, wherein the marketing activity comprises a combination of a marketing channel, marketing content, and a marketing time period; obtaining a reward score of the execution environment for the marketing activity; and updating the marketing strategy based on the reward score.

27 Claims, 7 Drawing Sheets

(51) Int. Cl.
*G06N 3/08* (2006.01)
*G06Q 40/08* (2012.01)

(52) U.S. Cl.
CPC ..... *G06Q 30/0224* (2013.01); *G06Q 30/0255* (2013.01); *G06Q 40/08* (2013.01)

(56) References Cited

U.S. PATENT DOCUMENTS

| | | | |
|---|---|---|---|
| 2008/0126030 A1* | 5/2008 | Jain | G06Q 30/02 703/2 |
| 2009/0132395 A1* | 5/2009 | Lam | G06Q 40/12 705/30 |
| 2012/0197709 A1 | 8/2012 | Kendall et al. | |
| 2015/0019307 A1 | 1/2015 | Girard et al. | |
| 2015/0073929 A1* | 3/2015 | Psota | G06Q 30/0241 705/26.2 |
| 2015/0379497 A1* | 12/2015 | Florez | G06Q 20/208 705/17 |
| 2016/0140603 A1 | 5/2016 | Kawamura et al. | |
| 2018/0025394 A1* | 1/2018 | Shuv | G06Q 30/0202 705/347 |
| 2018/0060901 A1* | 3/2018 | Lyndon-James | G06Q 30/0242 |

FOREIGN PATENT DOCUMENTS

| | | |
|---|---|---|
| CN | 106845817 | 6/2017 |
| CN | 106971321 | 7/2017 |
| CN | 107274201 | 10/2017 |
| CN | 107844988 | 3/2018 |
| CN | 108228579 | 6/2018 |
| CN | 108230057 | 6/2018 |
| CN | 109003143 | 12/2018 |

OTHER PUBLICATIONS

PCT International Search Report and Written Opinion in International Application No. PCT/CN2019/091649, dated Sep. 18, 2019, 9 pages (with partial English translation).

PCT International Preliminary Report on Patentability in International Application No. PCT/CN2019/091649, dated Feb. 9, 2021, 10 pages (with English translation).

Nakamoto, "Bitcoin: A Peer-to-Peer Electronic Cash System," www.bitcoin.org, Oct. 2009, 9 pages.

\* cited by examiner

DEEP REINFORCEMENT LEARNING METHODS AND APPARATUSES FOR REFERRAL MARKETING

CROSS-REFERENCE TO RELATED APPLICATIONS

This application is a continuation of PCT Application No. PCT/CN2019/091649, filed on Jun. 18, 2019, which claims priority to Chinese Patent Application No. 201810879896.3, filed on Aug. 3, 2018, and each application is hereby incorporated by reference in its entirety.

TECHNICAL FIELD

One or more embodiments of the present specification relate to the machine learning field, and in particular, to deep reinforcement learning methods and apparatuses for referral marketing.

BACKGROUND

As machine learning develops rapidly, various machine learning models have been used in a variety of service scenarios. For example, the machine learning models are used to assess credit risks of users, recommend appropriate content to users or send appropriate marketing information to users, predict advertising effectiveness, and so on.

In fact, a complete service process of a service scenario generally includes multiple stages or activities, which involve many factors. For example, in the referral marketing service scenario, the service can include at least the following activities: selection and sending of marketing information, and user feedback and tracking after the sending. These activities involve many factors and parameters, such as marketing channels, sending methods, reach rates, conversion rates, etc. Therefore, during attempt to apply machine learning to service scenarios, in view of many activities and factors in complex service scenarios, how to design and select an applicable model, and what factors are introduced to measure a service execution status all need to be considered.

Therefore, an improved solution is expected to more efficiently use machine learning to improve service execution results.

SUMMARY

One or more embodiments of the present specification describe deep reinforcement learning methods and apparatuses for referral marketing, so as to comprehensively learn multiple activities and factors in the referral marketing service to fully promote service results.

According to a first aspect, a deep reinforcement learning method for referral marketing is provided. The method includes the following: obtaining state information of an execution environment, where the state information includes at least user information of a current user; determining a corresponding marketing behavior for the state information based on a marketing strategy, where the marketing behavior includes a combination of a marketing channel, marketing content, and a marketing time period; obtaining a current reward score of the execution environment for the marketing behavior; and updating the marketing strategy based at least on the current reward score.

According to some implementations, the user information includes user basic attribute information and user historical behavior information.

Further, in some embodiments, the user historical behavior information includes at least one of the following: a historical operation sequence, a list of recently browsed pages, a list of recently accepted marketing information, a consumption record, a transaction record, a loan record, a travel record, and an insurance record.

In a possible design, the user information includes user profile information, and the user profile information is predetermined based on the user basic attribute information and/or the user historical behavior information.

In some embodiments, the state information further includes scenario information of a scenario in which the current user is located.

Further, in an example, the scenario information includes location service scenario information, payment scenario information, and wallet operation event information.

In a possible design, the marketing content includes a marketing message and a credit package, and the credit package includes one or more of the following: a red envelope, a coupon, and a right.

According to some implementations, the marketing channel includes one or more of the following: message sending, card display, badges reminder, and notification dots.

In some embodiments, the method further includes determining a return value based at least on the current reward score, where the return value includes a weighted sum of the current reward score and at least one future reward score; and the step of updating the marketing strategy includes determining a subsequent marketing strategy to maximize the return value.

According to a second aspect, a deep reinforcement learning apparatus for referral marketing is provided. The apparatus includes the following: a state acquisition unit, configured to obtain state information of an execution environment, where the state information includes at least user information of a current user; a behavior determination unit, configured to determine a corresponding marketing behavior for the state information based on a marketing strategy, where the marketing behavior includes a combination of a marketing channel, marketing content, and a marketing time period; a score acquisition unit, configured to obtain a current reward score of the execution environment for the marketing behavior; and an update unit, configured to update the marketing strategy based at least on the current reward score.

According to a third aspect, a computing device is provided, including a memory and a processor, where the memory stores executable code, and the processor executes the executable code to implement the method according to the first aspect.

According to the method and the apparatus provided in some embodiments of the present specification, the current state of the marketing environment is fully obtained; not only the user information of the current user is observed, but also the scenario in which the user is located is optionally observed; and the marketing behavior is determined based on the comprehensive marketing environment state. The marketing behavior is determined by comprehensively considering multiple factors, including the selection of the marketing channel, the selection of marketing content, and the determination of the marketing time period. The marketing behavior is determined based at least on the combination of the channel, the marketing content, and the marketing time period. As such, a marketing behavior determined by an agent simultaneously considers multiple factors in the marketing process; to be specific, the deep reinforcement learning system simultaneously learns multiple activities and factors in the marketing process, so as to comprehensively learn the entire service process and service target of referral marketing, and better promote service execution results.

BRIEF DESCRIPTION OF DRAWINGS

To describe the technical solutions in some embodiments of the present specification more clearly, the following briefly introduces the accompanying drawings needed for describing some embodiments. Clearly, the accompanying drawings in the following description are merely some embodiments of the present specification, and a person of ordinary skill in the art can still derive other drawings from these accompanying drawings without creative efforts.

DESCRIPTION OF EMBODIMENTS

According to one or more embodiments of the present specification, deep reinforcement learning is used to promote service results of referral marketing. The solutions provided in the present specification are described below with reference to the accompanying drawings.

Figure 1:
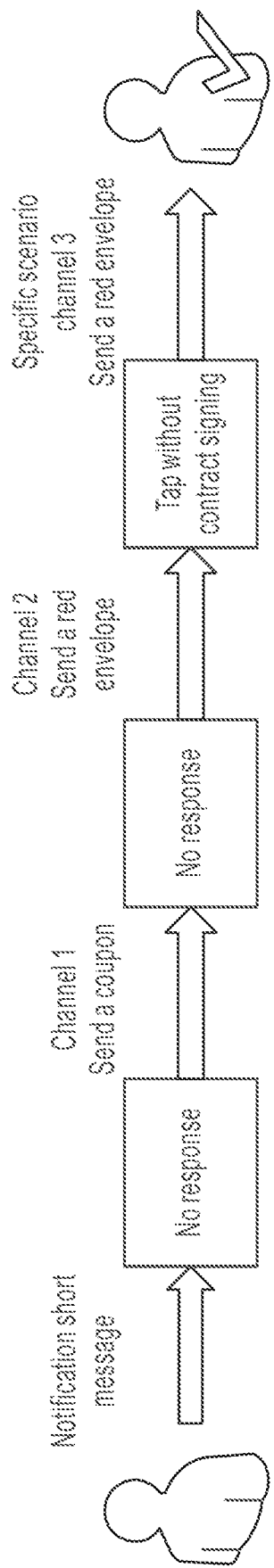
FIG. 1 is a schematic diagram illustrating execution of referral marketing, according to some embodiments disclosed in the present specification.

FIG. 1 is a schematic diagram illustrating execution of referral marketing, according to some embodiments disclosed in the present specification. In a referral marketing scenario, the final marketing goal may need to be achieved through multiple times of marketing by changing various marketing methods. For example, for a certain user A, a marketing message is first sent for the user, but the user does not respond. Next, a credit package such as a coupon is sent to the user through channel 1, but the user still does not respond. Then, another credit package such as a red envelope is sent to the user through another channel such as channel 2, and the user taps on the marketing content, but does not sign a contract. Next, in a particular scenario, a similar red envelope is sent through a particular channel, and the user signs a contract.

It can be seen from the previous process that, referral marketing is a complex process, and its complete service process includes multiple activities and interactions, for example, includes at least the following activities: selection and sending of marketing information, and user feedback and tracking after the sending. These activities involve many factors and parameters, such as marketing channels, sending methods, sending content, sending scenarios, sending time, etc.

In an implementation solution, considering the impact of multiple activities and factors in the interaction process on the final marketing goal, each factor of each activity is modeled and learned separately. For example, to consider the impact of channel differentiation on user conversion, a channel selection model is established and trained to explore the user's perception on different channels. To consider the impact of marketing content (also referred to as an offer, i.e., various marketing information provided to the user) on user conversion, an offer differential selection model is established and trained to explore interests of different users in different types of offers. Considering that different users have different habits in using APPs, a period selection model is established and trained to carry out time-based differential marketing. Considering that the marketing goal is usually achieved through multiple interactions and activities, a sequential serial marketing model is established (for example, a long short-term memory (LSTM) network is used) to track the serial impact of multiple times of marketing on the user. With such a solution, targeted learning can be conducted for each activity and each factor.

However, in such a solution, each model needs to be designed, trained, and evaluated separately, which is very costly. To estimate an overall execution result of the service, multiple models need to be used to predict one by one, and then prediction results are integrated. Complexity and operation costs of the prediction process are relatively high. If the service content is changed, each model usually needs to be retrained.

In addition, in such a solution, an error occurring on any model may affect the final marketing result. In fact, prediction results of some of multiple individual models are usually not satisfactory. For example, in an example, an offer differential selection model established by using a deep neural network (DNN) categorizes offers into 27 types for multi-class learning. From the macro average and confusion matrix measured for this model, the prediction accuracy needs to be further improved.

On this basis, some embodiments of the present specification further provide a solution in which a deep reinforcement learning system is used to carry out referral marketing, so as to further improve the service result.

Figure 2:
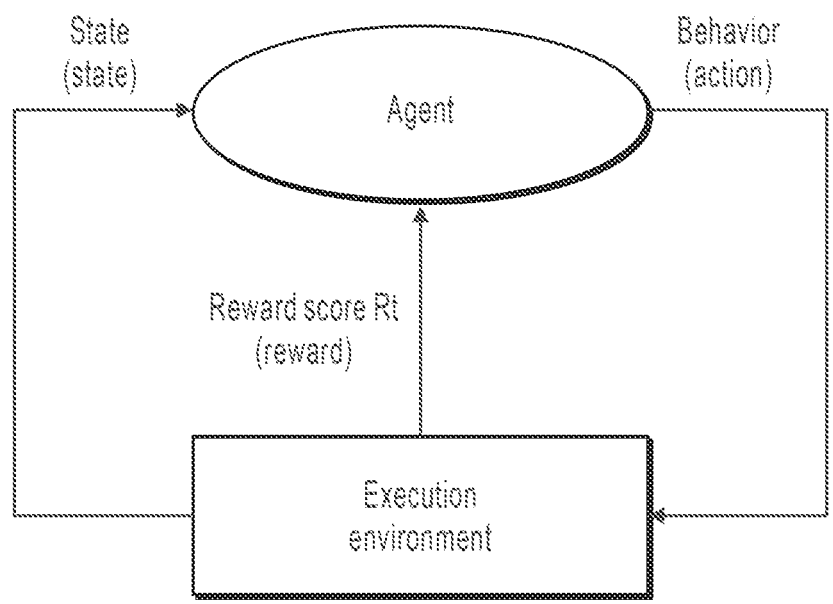
FIG. 2 is a schematic diagram illustrating a deep reinforcement learning system.

FIG. 2 is a schematic diagram illustrating a deep reinforcement learning system. Generally, the deep reinforcement learning system includes an agent and an execution environment. The agent continuously learns and optimizes its strategies through interaction and feedback with the execution environment. Specifically, the agent observes and obtains a state of the execution environment, and determines a behavior or an action to be taken for the current state of the execution environment based on a certain strategy. Such a behavior affects the execution environment, changes the state of the execution environment, and at the same time generates a feedback and provides the feedback to the agent. The feedback is also referred to as a reward score. The agent determines, based on the obtained reward score, whether the previous behavior is correct and whether the strategy needs to be adjusted, and then updates its strategy. By repeatedly observing the state, determining the behavior, and receiving feedback, the agent can continuously update the strategy. The final goal is to be able to obtain a strategy through learning, so that an accumulation of obtained reward scores is maximized. This is a typical reinforcement learning process. In the process of learning and adjusting strategies, if the agent uses some deep learning algorithms including a neural network, such a system is referred to as a deep reinforcement learning system.

According to some embodiments of the present specification, deep reinforcement learning is applied to a referral marketing system. In a referral marketing scenario, the execution environment is a referral marketing environment. Correspondingly, the agent observes the state of the marketing environment, and determines an appropriate marketing behavior for the current state of the marketing environment based on some marketing strategies. The marketing behavior changes the state of the marketing environment, and generates a reward score and feeds back the reward score to the agent. The agent can then adjust and update its marketing strategy based on the reward score. According to one or more embodiments of the present specification, the current state of the marketing environment is fully obtained; not only the user information of the current user is observed, but also the scenario in which the user is located is optionally observed; and the marketing behavior is determined based on the comprehensive marketing environment state. The marketing behavior is determined by comprehensively considering multiple factors, including the selection of the marketing channel, the selection of marketing content, and the determination of the marketing time period. The marketing behavior is determined based at least on the combination of the channel, the marketing content, and the marketing time period. As such, a marketing behavior determined by an agent simultaneously considers multiple factors in the marketing process; to be specific, the deep reinforcement learning system simultaneously learns multiple activities and factors in the marketing process, so as to comprehensively learn the entire service process and service target of referral marketing, and better promote service execution results. The following describes implementations of the previous ideas.

Figure 3:
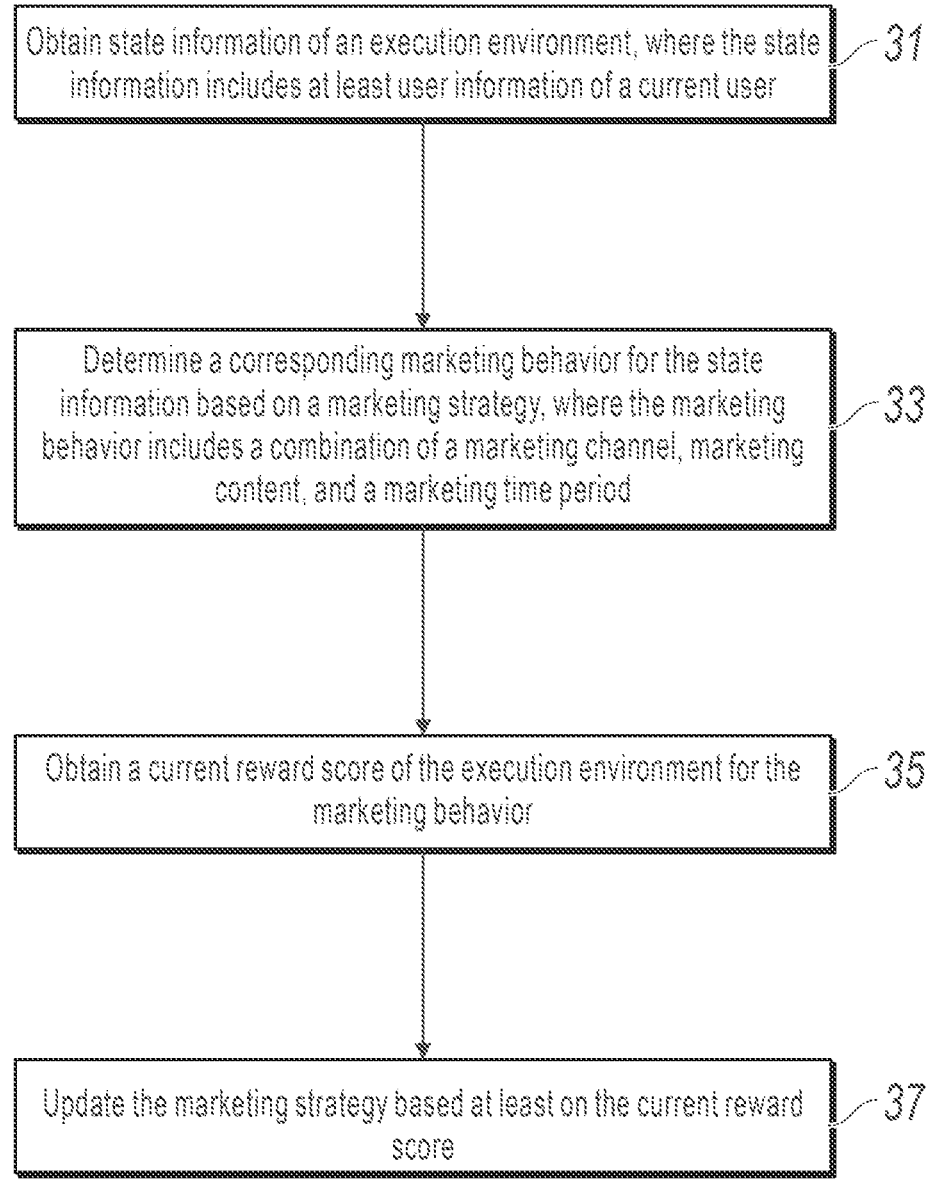
FIG. 3 shows a deep reinforcement learning method for referral marketing, according to some embodiments.

FIG. 3 shows a deep reinforcement learning method for referral marketing, according to some embodiments. It can be understood that the method can be implemented by the deep reinforcement learning system for referral marketing shown in FIG. 2. The system includes an agent and an execution environment. The agent is configured to determine a marketing behavior for a state of the execution strategy based on a marketing strategy, and update the marketing strategy based on a reward score obtained through feedback for the marketing behavior. More specifically, the method can be performed by an agent in the deep reinforcement learning system. From the perspective of a physical entity, the previous agent can be implemented or executed by any apparatus, device, platform, device cluster, etc. with data computing and processing capabilities.

As shown in FIG. 3, the method includes at least: step 31: obtaining state information of an execution environment, where the state information includes at least user information of a current user; step 33: determining a corresponding marketing behavior for the state information based on a marketing strategy, where the marketing behavior includes a combination of a marketing channel, marketing content, and a marketing time period; step 35: obtaining a current reward score of the execution environment for the marketing behavior; and step 37: updating the marketing strategy based at least on the current reward score. The following describes specific execution methods for the previous steps.

First, in step 31, state information of an execution environment is obtained. As described previously, in the deep reinforcement learning system for referral marketing, the agent continuously observes and obtains a current state of a referral marketing environment to determine a marketing behavior that should be taken. In some implementations, the state information of the marketing environment obtained by the agent can include user information of a current user. In some embodiments, the user information can include user basic attributes and characteristics, such as registration duration, age, gender, income, assets, etc. In some embodiments, the user information further includes the user historical behavior information, such as a historical operation sequence, a list of recently browsed pages, a list of recently accepted marketing information, a recent consumption record, a recent transaction record, a recent loan record, and a recent travel record, a recent insurance record, etc.

In some embodiments, the user information can further include user profile information. It can be understood that, in some implementations, the user has been given a corresponding user profile based on basic attribute information and/or historical behavior information of the user according to some algorithms. For example, the user profile information can include a crowd label for categorizing the user into a specific crowd based on the basic attribute information, a cluster label for clustering the user, a user behavior habit label constructed based on the user's historical behavior, etc. The previous various user information can constitute user characteristics of the current user.

In some embodiments, the previous deep reinforcement learning system performs training and decision-making in real time or online. In such case, the state information of the execution environment obtained in step 31 can further include scenario information of a scenario in which the current user is located. In an example, the scenario information includes at least one of the following: location service scenario information, payment scenario information, wallet operation event information, etc.

Specifically, for example, the location service scenario information is scenario information provided by a location based service (LBS). The LBS service is a service for obtaining location information of a mobile terminal user through a wireless communications network or external positioning. The scenario in which the user is located can be further determined based on the location information. For example, when it is determined, based on the LBS, that the user is located in a movie theater, the location service scenario information can be movie scenario information; when it is determined, based on the LBS, that the user is located in a mall, the location service scenario information can be shopping scenario information; when it is determined, based on the LBS, that the user is located in a food court, the location service scenario information can be food scenario information.

The payment scenario is another commonly used scenario. The payment scenario information can further include information about both parties to a transaction involved in the payment, information about a transaction object (such as a product), etc.

The wallet operation event can include various operations performed by the user in an electronic wallet, such as checking a balance, binding a bank card, transferring money, purchasing a financing service, etc.

The previous scenario information can be extracted as the state information of the referral marketing environment, and provided to the agent.

Next, in step 33, the agent determines a corresponding marketing behavior for the previously obtained state information based on a marketing strategy, where the marketing behavior includes a combination of a marketing channel, marketing content, and a marketing time period.

It can be understood that, for the reinforcement learning system, the agent maps the state of the environment to the next behavior based on the strategy. In the deep reinforcement learning system for referral marketing shown in FIG. 2, the agent is a decision-making entity, and maps a current state of the marketing environment to the next marketing behavior based on the marketing strategy. The marketing strategy is implemented by using complex deep learning algorithms such as Q-learning, DQN, etc. These algorithms usually include some deep neural network structures. As previously described, the current state of the marketing environment includes the user characteristics of the current user, and optionally further includes the information about the scenario in which the user is located. Once such current state information is obtained, the agent determines, by using a deep learning algorithm, a marketing behavior that should be taken for the current user. The determination of the marketing behavior includes at least selection and determination of a marketing channel, marketing content, and a marketing time period. The marketing behavior is formed based at least on a combination of these three factors. In other words, when obtaining the user information (and the optional scenario information), the agent determines, based on the marketing strategy, marketing information about what content should be recommended to the current user (in the scenario) at what time and through what channel.

In some embodiments, determining the marketing behavior includes determining the marketing channel. It can be understood that, there are many methods to convey marketing information to users, and these methods can be all referred to as marketing channels. Typically, the marketing channels can include message sending, card display, badges reminder, notification dots, etc.

Figure 4:
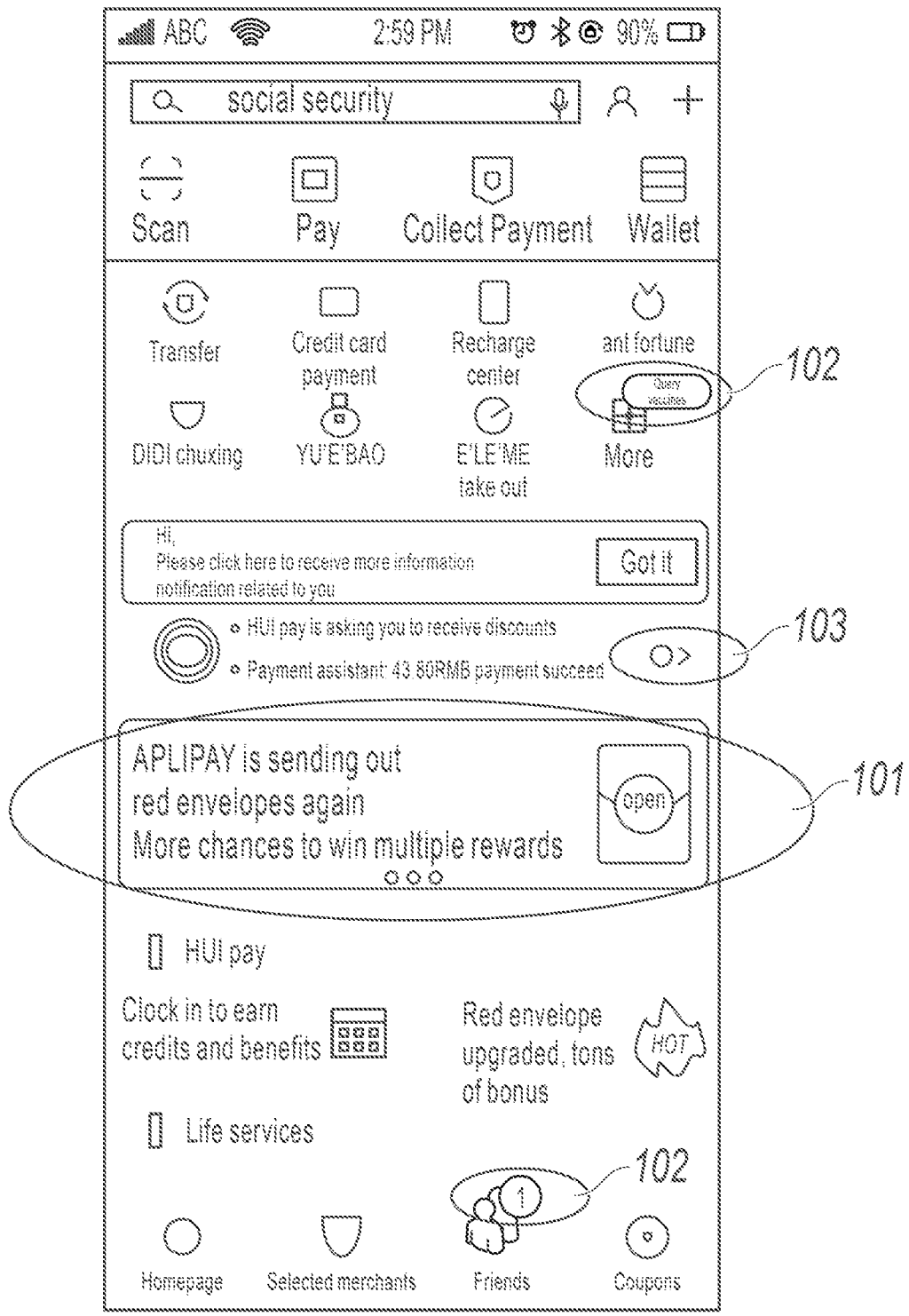
FIG. 4 shows examples of multiple marketing channels.

FIG. 4 shows examples of multiple marketing channels. In the example of FIG. 4, after the APP is started, a part 101 on the page is displayed for marketing in a form of a whole block as a card, that is, card display, which can also be referred to as an advertising banner, or a paper tape advertisement; a part 102 indicates that a badge is added as a marketing reminder to the upper right corner of the icon; a part 103 indicates that a notification dot is added as a marketing reminder to the upper right corner of the icon. FIG. 4 shows examples of only some common marketing channels. The marketing channels are not limited thereto. For example, the marketing channels further include message sending. The message sending can be a short message for sending marketing content to the user by using a text message of a mobile phone, or can include sending a reminder message by the APP to a terminal on which the APP is installed.

For example, by using a deep learning algorithm, the agent selects a marketing channel applicable to the current environmental state from the various marketing channels shown previously.

In some embodiments, determining the marketing behavior further includes determining the marketing content. It can be understood that the marketing information can be expressed as a variety of marketing content, including, for example, a marketing message and a credit package. The marketing message can be a message that does not contain benefit costs, for example, some notification messages such as "ANT FOREST adds a new function of planting trees through friend interaction", "ALIPAY launches exclusive services for existing users", and so on. The credit package is a form of marketing that contains some benefit costs, such as a red envelope, a coupon, a right, etc. The red envelope can include an amount of funds that can be used or deducted in various scenarios. The coupon further includes, for example, an instant discount, a discount voucher, a situational coupon (such as a movie ticket coupon and a food coupon) that can be used only in a specific scenario, an interest-free coupon, etc. The right can include other benefit-related offers, such as insurance benefits, value-added financing benefits, etc.

For example, by using a deep learning algorithm, the agent selects marketing content applicable to the current environmental state from the various marketing content shown previously.

In some embodiments, determining the marketing behavior further includes determining the marketing time period. It can be understood that, different users have different APP use habits, and these use habits can be reflected in that frequency of using the APP in different periods and duration for maintaining attention are different. The same user has different sensitivity and attention to the marketing information in different periods. Therefore, according to some implementations, the marketing time period is divided in terms of multiple dimensions. For example, in an example, in terms of time dimension for every days of a week, the marketing time period is divided into working days (such as Monday to Friday) and non-working days (such as Saturday and Sunday) based on working time. In an example, in terms of hours within a day, the marketing time period in a day is divided into working hours (e.g., 9 am to 6 pm) and non-working hours based on working hours. In another example, a day is divided into dining periods and other periods based on the average dining time. Further, other periods can be divided into early morning (before breakfast), morning (between breakfast and lunch), afternoon (between lunch and dinner), and evening (after dinner). It should be understood that, the marketing time period can also be divided in other methods. In general, the division of the marketing time period can be based on distribution or association statistics of user behaviors related to marketing operations over time.

By using a deep learning algorithm, the agent selects a marketing time period applicable to the current environment state from multiple marketing time periods that are obtained through division in terms of various dimensions in various methods.

As such, the agent determines the marketing channel, the marketing content, and the marketing time period that are applicable to the current environment state based on the learned and trained marketing strategy, and determines, based on a combination of these three factors, the next marketing behavior to be taken.

After such marketing behavior affects the marketing environment, in step 35, a current reward score of the execution environment for the marketing behavior can be obtained.

In some embodiments, the current reward score is determined based on the user's response to the marketing behavior, for example, whether the user receives the marketing information (i.e., whether the marketing information reaches the user), whether the user taps the marketing information, whether the user signs a contract, and whether the user sets recommended content in the marketing information as a homepage or as a preferred option, and so on. As such, the reward score reflects multiple result goals to be optimized.

Then, in step 37, the marketing strategy is updated based at least on the current reward score. As such, multiple factors are comprehensively considered in each activity to learn, train, and optimize the marketing strategy.

Figure 5:
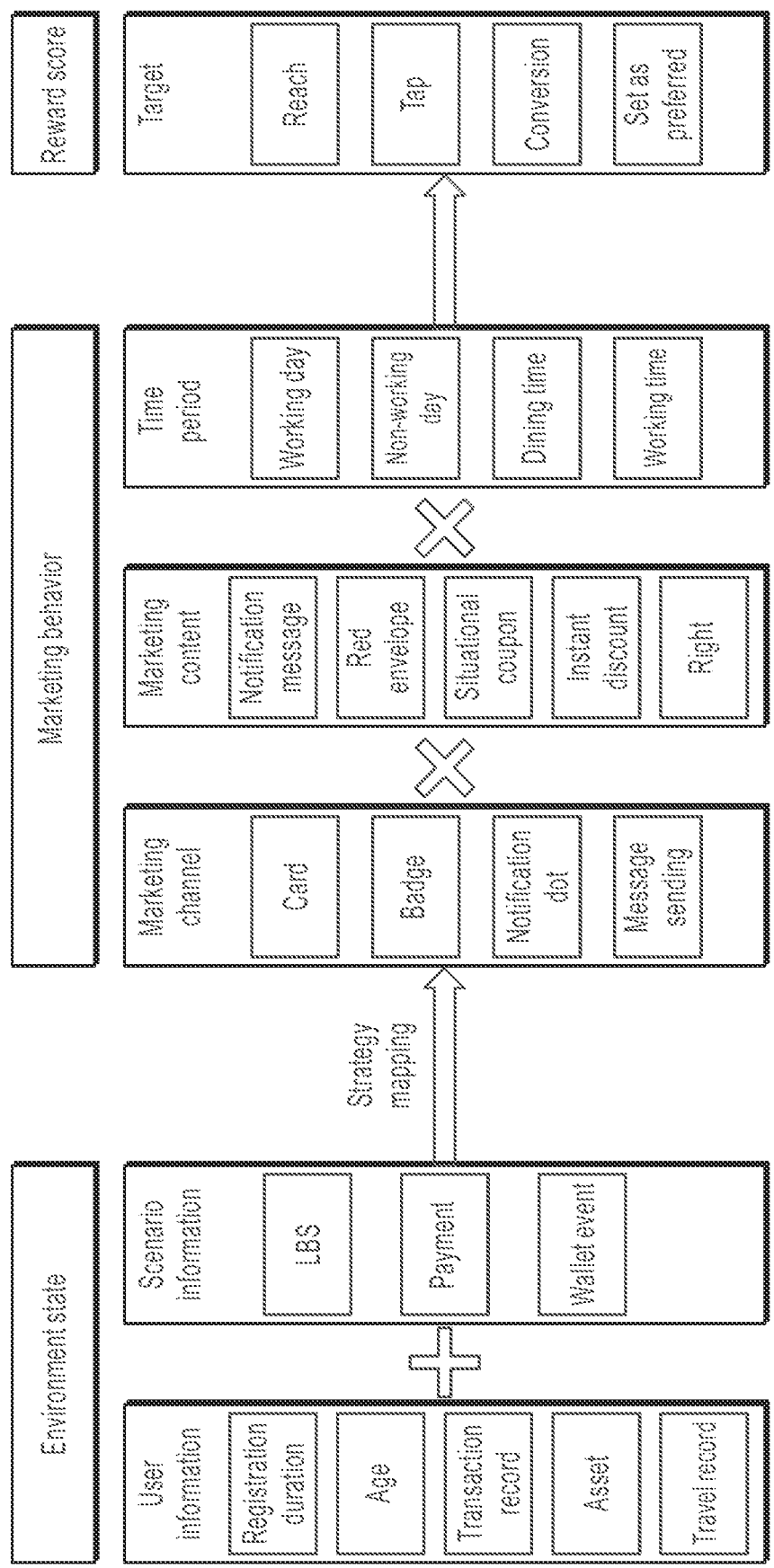
FIG. 5 is an overall schematic diagram illustrating deep reinforcement learning for referral marketing, according to some embodiments.

FIG. 5 is an overall schematic diagram illustrating deep reinforcement learning for referral marketing, according to some embodiments. As shown in FIG. 5, according to some embodiments of the present specification, a deep reinforcement learning system comprehensively observes and obtains state information of an execution environment to obtain more comprehensive state characteristics. These characteristics include the user's comprehensive user characteristics and scenario characteristics of a scenario in which the user is located.

Then, deep learning and training marketing strategies are used to map the previous comprehensive state characteristics to marketing behaviors. The marketing behaviors involve a cross-product combination of various marketing factors to be decided, such as a combination of the marketing channel, the marketing content, and the marketing time period. The marketing channel can be selected from message sending, card display, badges reminder, notification dots, etc. The marketing content can be selected from a marketing message, a red envelope, a coupon, a right, etc. The marketing time period can be selected from working hours, non-working hours, dining time, etc. Through the selection and combination of the marketing channel, the marketing content, and the marketing time period, the marketing behavior for the environment state information is obtained.

After such marketing behavior affects the execution environment, a reward score is generated. The reward score can be determined based on the user's response to multiple goals that need to be optimized for the marketing behavior.

As such, the comprehensive characteristics of the marketing environment are considered in the process of deep reinforcement learning for referral marketing, and multiple factors involved in marketing are comprehensively considered during decision making, so as to fully learn, train, and optimize the marketing strategy, and promote the service result of the marketing service more comprehensively and effectively.

In some embodiments, on the basis of obtaining the current reward score, that is, after step 35 and before step 37, a return value is determined based on the obtained current reward score; then in step 37, the marketing strategy is optimized based on the return value. It can be understood that, in the deep reinforcement learning system, the agent continuously updates and optimizes the strategy, so that an accumulation of reward scores is maximized. In other words, in the case of sequence learning, not only the current reward score, but also an accumulated value of reward scores in multiple interactions needs to be considered. For such purpose, the return value can be defined to evaluate an expected accumulation of reward scores.

In the scenario of deep reinforcement learning for referral marketing in some previous embodiments, the return value can be defined as a weighted sum that includes the current reward score and at least one future reward score, where each reward score is a feedback of the execution environment for the current marketing behavior.

In a specific example, the return value is defined as follows:

$$G_t = R_{t+1} + \gamma R_{t+2} + \gamma^2 R_{t+3} + \ldots = \sum_{k=0}^{\infty} \gamma^k R_{t+k+1}$$

Here, $G_t$ represents the return value; $R_{t+k+1}$ represents a reward score at a moment t+k+1 after a set of actions are performed at a moment t; and $\gamma$ represents a discount factor, which can be treated as a weighting coefficient. Thus, $R_{t+1}$ represents an immediate reward, which is the previous current reward score, and the subsequent $R_{t+k+1}$ (when k is not 0) represents an expected future reward score. When $\gamma$ is 0, it indicates that only the current reward score is considered, and no long-term reward is considered; when $\gamma$ is not 0, it indicates that the long-term reward score is taken into consideration. Generally, $0<\gamma<1$, a larger value of $\gamma$ indicates higher importance of the future reward score. In addition, due to an exponential effect, a farther future reward score leads to less impact on the return value.

In the referral marketing scenario, the previous definition of the return value can still be used to determine impact of a marketing behavior on the future. As described previously, the determined marketing behavior includes at least a combination of the marketing channel, the marketing content, and the marketing time period, where each factor affects the current reward score and the future reward score.

For the previous definition of the return value, the marketing strategy is optimized by solving the Bellman equation. The optimization goal is to maximize the return value. For example, the process of solving the Bellman equation can include value iteration, strategy iteration, Q-learning, Sarsa, etc.

Because each update and optimization of the marketing strategy is based on the return value, and the long-term future reward score is considered in the return value, the marketing strategy obtained through training in such method actually takes a time sequence of marketing into account, thereby implementing serial marketing. For example, for the multiple times of marketing shown in FIG. 1, through the learning of the return value and the optimization of the marketing strategy, the marketing strategy can be used to more quickly predict a scenario, a channel, and marketing content for which the user may accept the contract signing, thereby achieving faster user conversion and promoting the improvement of the service result.

Figure 6:
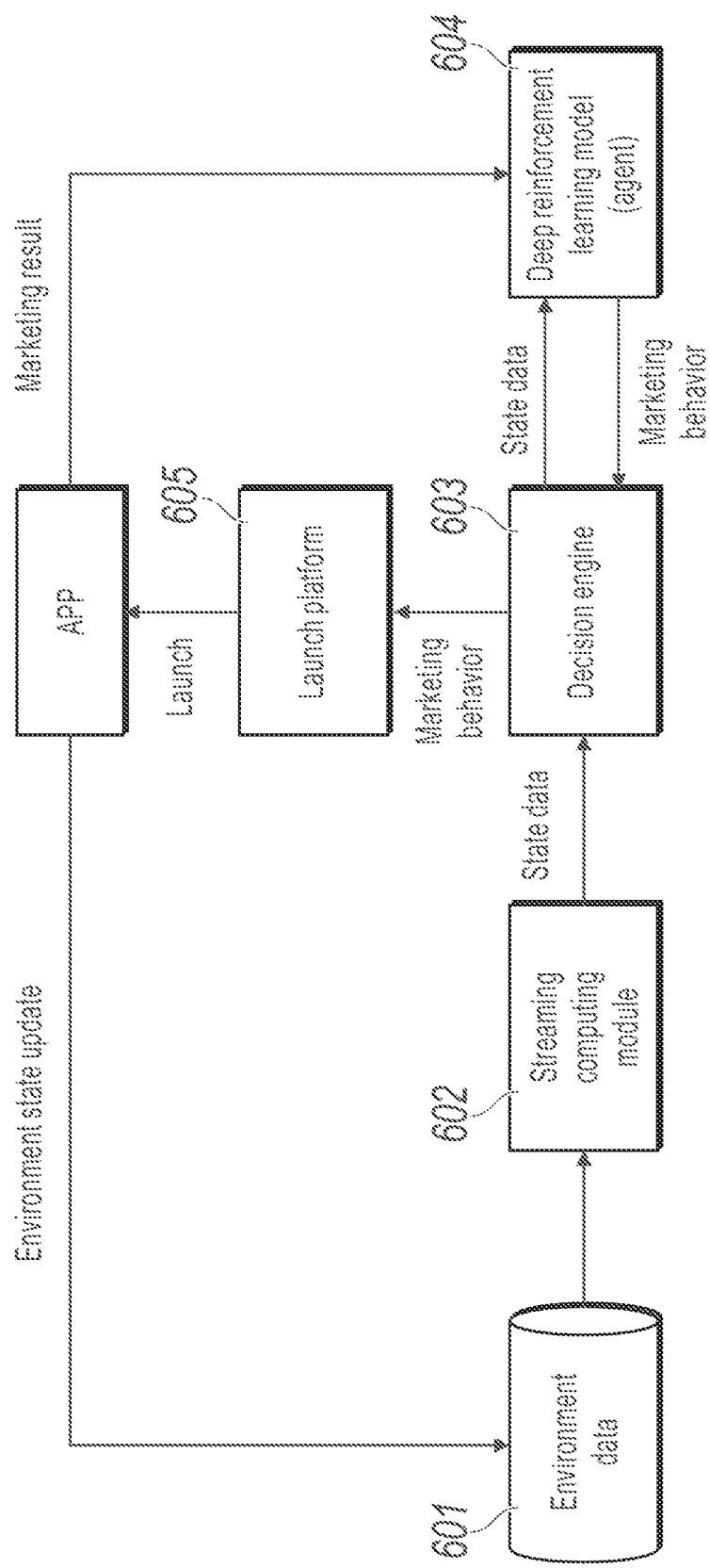
FIG. 6 is a schematic diagram illustrating an architecture of a referral marketing system, according to some embodiments.

FIG. 6 is a schematic diagram illustrating an architecture of a referral marketing system, according to some embodiments. As shown in FIG. 6, the system architecture includes at least an environment database 601, a streaming computing module 602, a decision engine 603, a deep reinforcement learning marketing model 604, and a launch platform 605. Based on the architecture, the streaming computing module 602 reads state information of a marketing environment from the database 601 that records the marketing environment. The database 601 that records the marketing environment can take various forms of common databases such as ODPS, OSS, Hbase, etc. The streaming computing module 602 can be connected to the previous various forms of databases to read marketing environment state data in real time. In the case of offline training and prediction, the streaming computing module 602 can scan the user information of each user in the database as the previous environment state data. In the case of online or real-time training and prediction, the streaming computing module 602 can also obtain scenario characteristics of a scenario in which the user is located, as the previous environment state data.

The streaming computing module 602 sends the read environment state data to the decision engine 603. The decision engine 603 uses such environment state data to invoke the deep reinforcement learning marketing model 604, which is the marketing strategy model trained by the agent in the previous deep reinforcement learning system. Thus, the marketing strategy model determines a marketing behavior that should be taken for the environment state data. The marketing form includes at least a combination of a marketing channel, marketing content, and a marketing time period. After receiving the marketing behavior returned by the model, the decision engine 603 sends the data of the marketing behavior to the launch platform 605 for launching.

Generally, the launch platform 605 predetermines some launch rules and policies, such as launch density, fatigue control, marketing competition rules, etc. On the basis of satisfying the launch rules and policies, the launch platform 605 launches corresponding marketing content based on specific settings of the marketing channel, the marketing content, and the marketing time period in the marketing behavior. For example, if message sending is selected as the marketing channel in the marketing behavior, and the period is not limited, the launch platform can immediately send a message for the corresponding marketing content. If the marketing channel is card display, card content can be associated with a corresponding user, so that the user can see the card display when starting the APP next time.

After such marketing behavior affects the user, a marketing result is generated. As such, on one hand, the environment state is further updated, which is used to update the environment database 601. On the other hand, the marketing result can be used as a basis for evaluating the reward score or the return value, and returned to the deep reinforcement learning marketing model 604 so that the marketing strategy model is further optimized and updated.

As previously described, in one or more embodiments of the present specification, the deep reinforcement learning system is used for referral marketing. In such process, the agent obtains the comprehensive characteristics of the marketing environment, and comprehensively considers multiple factors involved in marketing during decision making, so as to fully learn, train, and optimize the marketing strategy, and promote the service result of the marketing service more comprehensively and effectively.

According to another aspect, some embodiments of the present specification further provide an apparatus. The apparatus is applied to a deep reinforcement learning system for referral marketing. As shown in FIG. 2, the deep reinforcement learning system includes an agent and an execution environment. The agent is configured to determine a marketing behavior for state information of the execution environment based on a marketing strategy. The previous apparatus can be implemented by any software or hardware having computing and processing capabilities, or a combination thereof. In some embodiments, the previous apparatus is integrated into a physical apparatus for implementing the agent in the deep reinforcement learning system.

Figure 7:
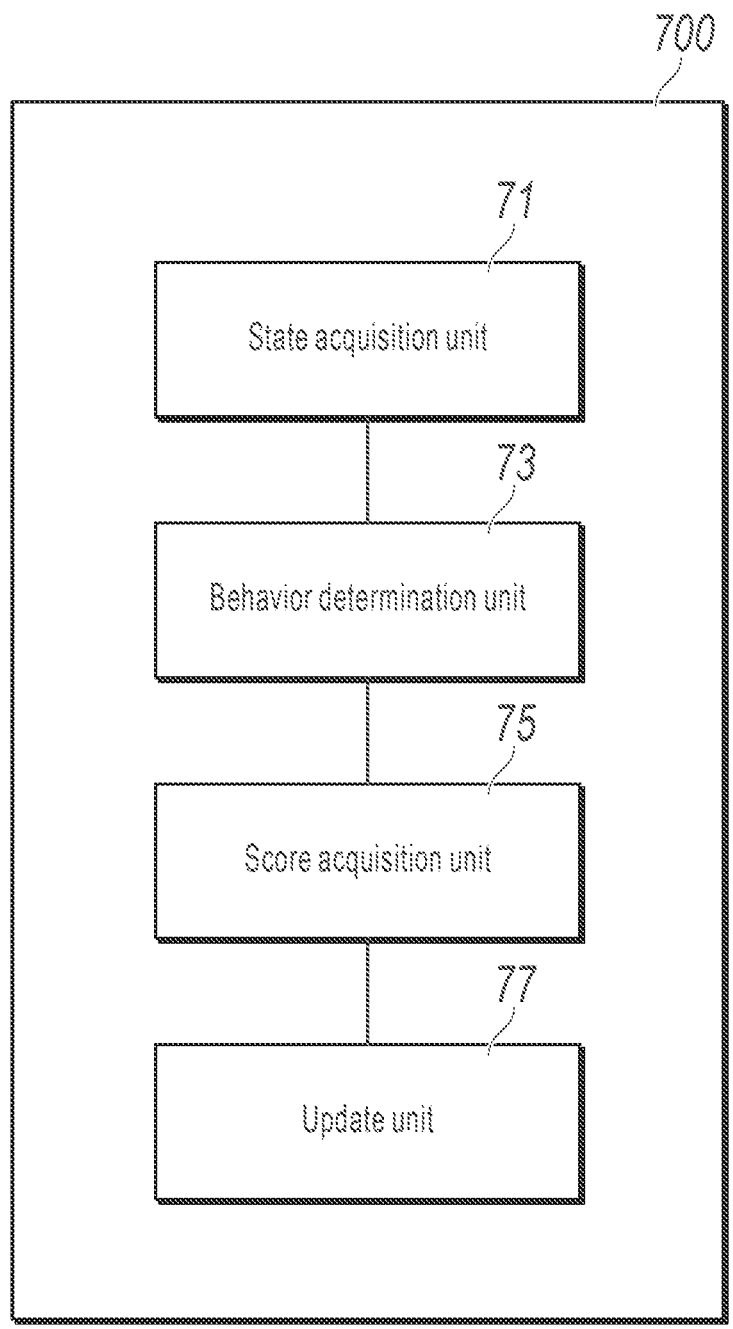
FIG. 7 is a schematic block diagram illustrating an apparatus, according to some embodiments.

FIG. 7 is a schematic block diagram illustrating an apparatus, according to some embodiments. As shown in FIG. 7, the apparatus 700 includes the following: a state acquisition unit 71, configured to obtain state information of an execution environment, where the state information includes at least user information of a current user; a behavior determination unit 73, configured to determine a corresponding marketing behavior for the state information based on a marketing strategy, where the marketing behavior includes a combination of a marketing channel, marketing content, and a marketing time period; a score acquisition unit 75, configured to obtain a current reward score of the execution environment for the marketing behavior; and an update unit 77, configured to update the marketing strategy based at least on the current reward score.

According to some embodiments, the user information can include user basic attribute information and user historical behavior information.

In an example, the user historical behavior information includes at least one of the following: a historical operation sequence, a list of recently browsed pages, a list of recently accepted marketing information, a consumption record, a transaction record, a loan record, a travel record, and an insurance record.

In an example, the user information can further include user profile information that is determined based on the user basic attribute information and/or the user historical behavior information.

According to some embodiments, the state information of the execution environment further includes scenario information of a scenario in which the current user is located.

Further, the scenario information can include location service scenario information, payment scenario information, and wallet operation event information.

In some embodiments, the previous marketing content includes a marketing message and a credit package, and the credit package includes one or more of the following: a red envelope, a coupon, and a right.

In some embodiments, the previous marketing channel includes one or more of the following: message sending, card display, badges reminder, and notification dots.

According to some implementations, the apparatus further includes a return value determination unit (not shown). The unit determines a return value based at least on the current reward score, where the return value includes a weighted sum of the current reward score and at least one future reward score. Correspondingly, the update unit 77 is configured to determine a subsequent marketing strategy to maximize the return value.

According to still some other embodiments, a computing device is further provided, including a memory and a processor, where the memory stores executable code, and the processor executes the executable code to implement the method described with reference to FIG. 3.

A person skilled in the art should be aware that in the previous one or more examples, functions described in the present specification can be implemented by hardware, software, firmware, or any combination thereof. When these functions are implemented by software, they can be stored in a computer readable medium or transmitted as one or more instructions or code lines on the computer readable medium.

The previous specific implementations further describe the objectives, technical solutions and beneficial effects of the present specification. It should be understood that the previous descriptions are merely specific implementations of the present specification and are not intended to limit the protection scope of the present specification. Any modification, equivalent replacement and improvement made based on the technical solutions of the present specification shall fall within the protection scope of the present specification.

What is claimed is:

1. A computer-implemented method based on deep reinforcement learning, comprising:
   obtaining state information of an execution environment of a deep reinforcement learning system, wherein the execution environment comprises a referral marketing environment, and wherein the state information of the execution environment comprises user information of a current user and information associated with a current market of the deep reinforcement learning system, and wherein the information associated with the current market comprises marketing services and transactions associated with the current user;
   determining, by the deep reinforcement learning system, a marketing activity corresponding to the state information of the execution environment using a marketing strategy that is trained by a deep neural network in the deep reinforcement learning system and has classified offers, wherein the marketing activity comprises a combination of a marketing channel, marketing content, and a marketing time period, and wherein determining the marketing activity comprises:

obtaining historical behavior information of the current user from the user information of the current user, wherein the historical behavior information comprises at least one of a historical channel, a historical marketing content, or a historical transaction record;

generating a next marketing behavior using the historical behavior information of the current user based on the classified offers in the marketing strategy, wherein the next marketing behavior comprises the combination of the marketing channel, the marketing content, and the marketing time period corresponding to the at least one of a historical channel, a historical marketing content, or a historical transaction record;

selecting the marketing channel, the marketing content, and the marketing time period from the next marketing behavior applicable to the execution environment; and determining the marketing activity using the selected marketing channel, the marketing content, and the marketing time period;

adjusting the execution environment by updating the marketing activity;

in response to adjusting the execution environment by updating the marketing activity, obtaining a reward score of the execution environment for the marketing activity, wherein the reward score is determined based on a response of the current user to the marketing activity; and updating the marketing strategy based on the reward score.

2. The computer-implemented method according to claim 1, wherein the user information comprises user attribute information.

3. The computer-implemented method according to claim 2, wherein the historical behavior information comprises at least one of a historical user operation sequence, a list of recently browsed webpages, a list of recently received marketing information, a purchase record, a transaction record, a loan record, a travel record, or an insurance record.

4. The computer-implemented method according to claim 2, wherein the user information comprises user profile information predetermined based on at least one of the user attribute information or the historical behavior information.

5. The computer-implemented method according to claim 1, wherein the state information further comprises scenario information of a scenario that the current user is situated in.

6. The computer-implemented method according to claim 5, wherein the scenario information comprises location service scenario information, payment scenario information, and payment operation event information.

7. The computer-implemented method according to claim 1, wherein the marketing content comprises a marketing message and a benefit package, and the benefit package comprises one or more of a monetary reward, a coupon, or a purchase right.

8. The computer-implemented method according to claim 1, wherein the marketing channel comprises one or more of instant messaging, on-screen banners, or notification badges.

9. The computer-implemented method according to claim 1, further comprising:

determining a return value based on the reward score, wherein the return value comprises a weighted sum of the reward score and at least one future reward score; and determining a subsequent marketing strategy that increases the return value.

10. A non-transitory, computer-readable medium storing one or more instructions executable by a computer system to perform operations comprising:

obtaining state information of an execution environment of a deep reinforcement learning system, wherein the execution environment comprises a referral marketing environment, and wherein the state information of the execution environment comprises user information of a current user and information associated with a current market of the deep reinforcement learning system, and wherein the information associated with the current market comprises marketing services and transactions associated with the current user;

determining, by the deep reinforcement learning system, a marketing activity corresponding to the state information of the execution environment using a marketing strategy that is trained by a deep neural network in the deep reinforcement learning system and has classified offers, wherein the marketing activity comprises a combination of a marketing channel, marketing content, and a marketing time period, and wherein determining the marketing activity comprises:

obtaining historical behavior information of the current user from the user information of the current user, wherein the historical behavior information comprises at least one of a historical channel, a historical marketing content, or a historical transaction record;

generating a next marketing behavior using the historical behavior information of the current user based on the classified offers in the marketing strategy, wherein the next marketing behavior comprises the combination of the marketing channel, the marketing content, and the marketing time period corresponding to the at least one of a historical channel, a historical marketing content, or a historical transaction record;

selecting the marketing channel, the marketing content, and the marketing time period from the next marketing behavior applicable to the execution environment; and determining the marketing activity using the selected marketing channel, the marketing content, and the marketing time period;

adjusting the execution environment by updating the marketing activity;

in response to adjusting the execution environment by updating the marketing activity, obtaining a reward score of the execution environment for the marketing activity, wherein the reward score is determined based on a response of the current user to the marketing activity; and updating the marketing strategy based on the reward score.

11. The non-transitory, computer-readable medium according to claim 10, wherein the user information comprises user attribute information.

12. The non-transitory, computer-readable medium according to claim 11, wherein the historical behavior information comprises at least one of a historical user operation sequence, a list of recently browsed webpages, a list of recently received marketing information, a purchase record, a transaction record, a loan record, a travel record, or an insurance record.

13. The non-transitory, computer-readable medium according to claim 11, wherein the user information comprises user profile information predetermined based on at least one of the user attribute information or the historical behavior information.

14. The non-transitory, computer-readable medium according to claim 10, wherein the state information further comprises scenario information of a scenario that the current user is situated in.

15. The non-transitory, computer-readable medium according to claim 14, wherein the scenario information comprises location service scenario information, payment scenario information, and payment operation event information.

16. The non-transitory, computer-readable medium according to claim 10, wherein the marketing content comprises a marketing message and a benefit package, and the benefit package comprises one or more of a monetary reward, a coupon, or a purchase right.

17. The non-transitory, computer-readable medium according to claim 10, wherein the marketing channel comprises one or more of instant messaging, on-screen banners, or notification badges.

18. The non-transitory, computer-readable medium according to claim 10, the operations further comprising:
determining a return value based on the reward score, wherein the return value comprises a weighted sum of the reward score and at least one future reward score; and
determining a subsequent marketing strategy that increases the return value.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining state information of an execution environment of a deep reinforcement learning system, wherein the execution environment comprises a referral marketing environment, and wherein the state information of the execution environment comprises user information of a current user and information associated with a current market of the deep reinforcement learning system, and wherein the information associated with the current market comprises marketing services and transactions associated with the current user;
determining, by the deep reinforcement learning system, a marketing activity corresponding to the state information of the execution environment using a marketing strategy that is trained by a deep neural network in the deep reinforcement learning system and has classified offers, wherein the marketing activity comprises a combination of a marketing channel, marketing content, and a marketing time period, and wherein determining the marketing activity comprises:
obtaining historical behavior information of the current user from the user information of the current user, wherein the historical behavior information comprises at least one of a historical channel, a historical marketing content, or a historical transaction record;
generating a next marketing behavior using the historical behavior information of the current user based on the classified offers in the marketing strategy, wherein the next marketing behavior comprises the combination of the marketing channel, the marketing content, and the marketing time period corresponding to the at least one of a historical channel, a historical marketing content, or a historical transaction record;
selecting the marketing channel, the marketing content, and the marketing time period from the next marketing behavior applicable to the execution environment; and
determining the marketing activity using the selected marketing channel, the marketing content, and the marketing time period;
adjusting the execution environment by updating the marketing activity;
in response to adjusting the execution environment by updating the marketing activity, obtaining a reward score of the execution environment for the marketing activity, wherein the reward score is determined based on a response of the current user to the marketing activity; and
updating the marketing strategy based on the reward score.

20. The computer-implemented system according to claim 19, wherein the user information comprises user attribute information.

21. The computer-implemented system according to claim 20, wherein the historical behavior information comprises at least one of a historical user operation sequence, a list of recently browsed webpages, a list of recently received marketing information, a purchase record, a transaction record, a loan record, a travel record, or an insurance record.

22. The computer-implemented system according to claim 20, wherein the user information comprises user profile information predetermined based on at least one of the user attribute information or the historical behavior information.

23. The computer-implemented system according to claim 19, wherein the state information further comprises scenario information of a scenario that the current user is situated in.

24. The computer-implemented system according to claim 23, wherein the scenario information comprises location service scenario information, payment scenario information, and payment operation event information.

25. The computer-implemented system according to claim 19, wherein the marketing content comprises a marketing message and a benefit package, and the benefit package comprises one or more of a monetary reward, a coupon, or a purchase right.

26. The computer-implemented system according to claim 19, wherein the marketing channel comprises one or more of instant messaging, on-screen banners, or notification badges.

27. The computer-implemented system according to claim 19, the operations further comprising:
determining a return value based on the reward score, wherein the return value comprises a weighted sum of the reward score and at least one future reward score; and
determining a subsequent marketing strategy that increases the return value.

* * * * *